(12) United States Patent
Wang

(10) Patent No.: US 9,755,775 B2
(45) Date of Patent: Sep. 5, 2017

(54) BASE STATION, NETWORK SYSTEM, AND COMMUNICATION METHOD

(71) Applicant: Huawei Technologies Co., Ltd., Shenzhen, Guangdong (CN)

(72) Inventor: Qiang Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 114 days.

(21) Appl. No.: 14/699,750

(22) Filed: Apr. 29, 2015

(65) Prior Publication Data

US 2015/0244489 A1 Aug. 27, 2015

Related U.S. Application Data

(63) Continuation of application No. PCT/CN2013/082856, filed on Sep. 3, 2013.

(30) Foreign Application Priority Data

Nov. 5, 2012 (CN) .......................... 2012 1 0435763

(51) Int. Cl.
*G01R 31/08* (2006.01)
*H04J 11/00* (2006.01)
(Continued)

(52) U.S. Cl.
CPC .......... *H04J 11/0056* (2013.01); *H04B 7/024* (2013.01); *H04W 88/08* (2013.01); *H04W 92/20* (2013.01)

(58) Field of Classification Search
CPC .............................. H04J 11/0056; H04B 7/024
(Continued)

(56) References Cited

U.S. PATENT DOCUMENTS

2009/0253426 A1 10/2009 Qiu et al.
2010/0110897 A1 5/2010 Chun et al.
(Continued)

FOREIGN PATENT DOCUMENTS

CN 1466274 A 1/2004
CN 101202974 A 6/2008
(Continued)

OTHER PUBLICATIONS

"Coordinated multi-cell transmission for Lte-Advanced downlink", ETRI, 3GPP TSG RAN WG1 Meeting #54, Aug. 18-22, 2008, 4 pages, R1-082896.

*Primary Examiner* — Iqbal Zaidi
(74) *Attorney, Agent, or Firm* — Kilpatrick Townsend & Stockton LLP

(57) ABSTRACT

Embodiments of the present invention provide a base station, a network system, and a communication method. The base station includes: a control module, configured to connect to a control module of at least one other base station by using a first logical interface, and perform control plane interaction during inter-base station coordination; and a data processing module, connected to the control module, and configured to connect to a data processing module of the at least one other base station by using a second logical interface, and perform user plane interaction during the inter-base station coordination. The base station in this embodiment of the present invention is provided with the first logical interface and the second logical interface to respectively implement the control plane interaction and the user plane interaction between base stations, so that the inter-base station coordination can be implemented.

12 Claims, 12 Drawing Sheets

(51) Int. Cl.
*H04W 88/08* (2009.01)
*H04B 7/024* (2017.01)
*H04W 92/20* (2009.01)

(58) Field of Classification Search
USPC .................................................. 370/252–541
See application file for complete search history.

(56) References Cited

U.S. PATENT DOCUMENTS

| | | | |
|---|---|---|---|
| 2011/0028181 A1* | 2/2011 | Byun | H04W 36/0083 455/525 |
| 2012/0176987 A1 | 7/2012 | Kaminski et al. | |
| 2013/0223272 A1 | 8/2013 | Tao et al. | |
| 2014/0120927 A1 | 5/2014 | Liu | |
| 2015/0326282 A1 | 11/2015 | Futaki | |

FOREIGN PATENT DOCUMENTS

| | | |
|---|---|---|
| CN | 101877890 A | 11/2010 |
| CN | 102238613 A | 11/2011 |
| CN | 102308662 A | 1/2012 |
| CN | 102318396 A | 1/2012 |
| CN | 102395163 A | 3/2012 |
| CN | 102498738 A | 6/2012 |
| CN | 102932850 A | 2/2013 |
| EP | 2 498 530 A1 | 9/2012 |
| EP | 2 713 674 A1 | 4/2014 |
| JP | 2012-507971 A | 3/2012 |
| JP | 2013-541304 A | 11/2013 |
| WO | WO 2011/016560 A1 | 2/2011 |
| WO | WO 2012/062166 A1 | 5/2012 |

\* cited by examiner

BASE STATION, NETWORK SYSTEM, AND COMMUNICATION METHOD

CROSS-REFERENCE TO RELATED APPLICATION

This application is a continuation of International Application No. PCT/CN2013/082856, filed on Sep. 3, 2013, which claims priority to Chinese Patent Application No. 201210435763.X, filed on Nov. 5, 2012, both of which are herein incorporated by reference in their entirety.

TECHNICAL FIELD

Embodiments of the present invention relate to the wireless communications field, and in particularly, to a base station, a network system, and a communication method.

BACKGROUND

The third generation (3G) radio access technologies all use code division multiple access (CDMA) radio modulation technologies, including CDMA 2000, wideband code division multiple access (WCDMA), time division-synchronous code division multiple access (TD-SCDMA), and the like. Neighboring cells or sectors may be distinguished by different orthogonal codes, and a frequency reuse factor of 1 may be achieved (neighboring cells may use a same frequency without causing interference to each other).

The fourth generation (4G) radio access technologies use orthogonal frequency division multiplexing (OFDM) radio modulation technologies, including long term evolution (LTE), worldwide interoperability for microwave access (WiMAX), and the like. If neighboring cells or sectors are on a same frequency, the neighboring cells or sectors may interfere with each other, and consequently networking similar to the second generation (2G) radio access technologies is necessitated in which a frequency reuse factor is 3-7 (cells or sectors using a same frequency are spaced apart by 3-7 cells or sectors).

Bandwidth of a frequency channel is wide (typically 10M or 20M) in 4G, and if the foregoing deployment mode is used, an operator needs to be licensed with extremely wide of frequencies, often at unacceptably high cost and with great technical difficulties. For this reason, a 4G system typically still uses a frequency reuse factor of 1, and employs inter-cell coordination technologies, such as single frequency network (SFN) and coordinated multi-point (CoMP), to suppress interference and increase capacity.

In addition, to increase bandwidth of a single cell, a carrier aggregation (CA) standard is developed for LTE, where multiple frequency channels are combined into one cell.

In the existing architecture, coordination services such as SFN, CoMP, and CA are confined to cells within a single base station, and do not support inter-base station coordination.

SUMMARY

Embodiments of the present invention provide a base station, a network system, and a communication method, which can implement inter-base station coordination.

According to a first aspect, a base station is provided, including: a control module, configured to connect to a control module of at least one other base station by using a first logical interface, and perform control plane interaction during inter-base station coordination; and a data processing module, connected to the control module, and configured to connect to a data processing module of the at least one other base station by using a second logical interface, and perform user plane interaction during the inter-base station coordination.

With reference to the first aspect, in an implementation, the base station further includes: a basic function module, connected to the control module and the data processing module, connected to a switch unit by using a physical interface, where the switch unit is configured to provide routing service and switching service for the control plane interaction performed by the control module and the user plane interaction performed by the data processing module.

With reference to the first aspect and the foregoing implementation, in another implementation, the data processing module includes an air-interface baseband link layer processing module and an air-interface physical layer processing module. The second logical interface includes at least one of the following: an interface between the air-interface baseband link layer processing module of the base station and an air-interface baseband link layer processing module of the at least one other base station; an interface between the air-interface baseband link layer processing module of the base station and an air-interface physical layer processing module of the at least one other base station; and an interface between the air-interface physical layer processing module of the base station and the air-interface physical layer processing module of the at least one other base station.

With reference to the first aspect and the foregoing implementations, in another implementation-, the inter-base station coordination includes at least one of the following: single frequency network coordination, coordinated multipoint, and carrier aggregation.

According to a second aspect, a network system is provided, including: —a first base station and a second base station, where the first base station is connected to the second base station by using a first logical interface and a second logical interface, the first logical interface is configured to perform control plane interaction during inter-base station coordination, and the second logical interface is configured to perform user plane interaction during the inter-base station coordination.

With reference to the second aspect, in an implementation-, the network system further includes: a switch unit, connected to the first base station and the second base station by using a physical interface, and configured to provide— routing service and—switching service for the control plane interaction and the user plane interaction.

With reference to the second aspect and the foregoing implementation-, in another implementation, the first base station includes a first control module and a first data processing module; and the second base station includes a second control module and a second data processing module, where the first logical interface is between the first control module and the second control module, and the second logical interface is between the first data processing module and the second data processing module.

With reference to the second aspect and the foregoing implementations, in another implementation, the first base station further includes a first basic function module, and the second base station further includes a second basic function module, where the first basic function module and the second basic function module are connected to the switch unit by using the physical interface, and are configured to provide routing service and switching service for the control plane interaction and the user plane interaction.

With reference to the second aspect and the foregoing implementations, in another implementation, the first data processing module includes a first air-interface baseband link layer processing module and a first air-interface physical layer processing module, the second data processing module includes a second air-interface baseband link layer processing module and a second air-interface physical layer processing module, and the second logical interface includes at least one of the following: an interface between the first air-interface baseband link layer processing module and the second air-interface baseband link layer processing module; an interface between the first air-interface baseband link layer processing module and the second air-interface physical layer processing module; and an interface between the first air-interface physical layer processing module and the second air-interface physical layer processing module.

According to a third aspect, a base station communication method is provided, including: exchanging, with at least one other base station by using a first logical interface, a control plane packet used for inter-base station coordination, or exchanging, with at least one other base station by using a second logical interface, a user plane packet used for inter-base station coordination; and performing the inter-base station coordination according to the control plane packet or the user plane packet.

With reference to the third aspect, in an implementation, the exchanging, with at least one other base station by using a first logical interface, a control plane packet used for inter-base station coordination, or exchanging, with at least one other base station by using a second logical interface, a user plane packet used for inter-base station coordination includes: sending the control plane packet or the user plane packet to a switch unit, so that the switch unit forwards the control plane packet or the user plane packet to the at least one other base station; or receiving, by the base station, the control plane packet or the user plane packet that is sourced from the at least one other base station and forwarded by the switch unit.

According to a fourth aspect, a network system communication method is provided, including: exchanging, by a first base station and a second base station by using a first logical interface, a control plane packet used for inter-base station coordination, or exchanging, by using a second logical interface, a user plane packet used for inter-base station coordination; and performing, by the first base station and the second base station, the inter-base station coordination according to the control plane packet or the user plane packet.

With reference to the fourth aspect, in an implementation, the exchanging, by a first base station and a second base station by using a first logical interface, a control plane packet used for inter-base station coordination, or exchanging, by using a second logical interface, a user plane packet used for inter-base station coordination includes: sending, by the first base station, the control plane packet or the user plane packet to a switch unit, where the control plane packet or the user plane packet carries an address of the second base station; and forwarding, by the switch unit, the control plane packet or the user plane packet to the second base station according to the address of the second base station carried in the control plane packet or in the user plane packet; or sending, by the second base station, the control plane packet or the user plane packet to a switch unit, where the control plane packet or the user plane packet carries an address of the first base station; and forwarding, by the switch unit, the control plane packet or the user plane packet to the first base station according to the address of the first base station carried in the control plane packet or in the user plane packet.

With reference to the fourth aspect and the foregoing implementation, in another implementation, the control plane packet includes at least one of the following: an activate cell message, carrying a cell configuration parameter and cell information that is of a sender from which the control plane packet is sourced; an activate cell response message, carrying information about an activated cell; and a cell state report message, carrying cell information of a sender from which the control plane packet is sourced.

With reference to the fourth aspect and the foregoing implementations, in another implementation, the inter-base station coordination includes at least one of the following: single frequency network coordination, coordinated multi-point, and carrier aggregation.

According to a fifth aspect, a cell configuration method is provided, including: receiving, by a first base station, a cell association command sent by an element management system, where the cell association command carries information about a second base station to be associated with a coordinated cell of the first base station; and associating, by the first base station, the coordinated cell of the first base station with the second base station according to the information about the second base station to be associated with the coordinated cell of the first base station.

With reference to the fifth aspect, in an implementation manner, the coordinated cell is a single frequency network coordinated cell, a coordinated multi-point cell, or a carrier aggregation cell involved in inter-base station coordination.

According to a sixth aspect, a base station is provided, including: a receiving unit, configured to receive a cell association command sent by an element management system, where the cell association command carries information about a second base station to be associated with a coordinated cell of the base station; and an association unit, configured to associate the coordinated cell of the base station with the second base station according to the information about the second base station to be associated with the coordinated cell of the base station.

The base station in the embodiments of the present invention is provided with a first logical interface and a second logical interface to respectively implement control plane interaction and user plane interaction between base stations, so that inter-base station coordination can be accomplished.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The technical solutions of the present invention may be applied to various communications systems, such as: a global system for mobile communications (GSM), a CDMA system, a WCDMA, a general packet radio service (GPRS) system, and a LTE system.

A user equipment (UE), also referred to as a mobile terminal, a mobile user equipment, and the like, may communicate with one or more core networks through a radio access network (for example, RAN). The user equipment may be a mobile terminal, such as a mobile phone (also referred to as a "cellular" phone) and a computer with a mobile terminal. For example, the user equipment may be a portable, pocket-sized, handheld, computer built-in, or in-vehicle mobile apparatus, which exchanges language and/or data with the radio access network.

A base station may be a base station (BTS) in a GSM or CDMA, may also be a base station (NodeB) in WCDMA, and may further be an evolved NodeB (eNB or e-NodeB) in LTE, which is not limited in the present invention.

Neither a 2G (GSM and CDMA) system nor a 3G (CDMA, WCDMA, and TD-SCDMA) system supports interconnection between base stations. In a 4G (LTE and WiMAX) system, an X2 interface between base stations is added to support interconnection between base stations. However, the X2 interface can support only a handover function.

Figure 1:
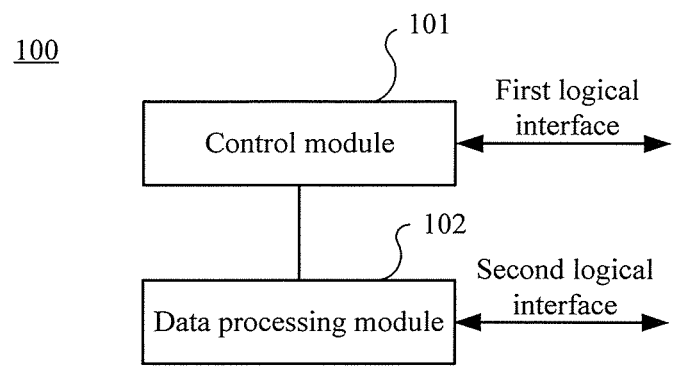
FIG. 1 is a schematic block diagram of a base station system according to an embodiment of the present invention.

FIG. 1 is a schematic block diagram of a base station according to an embodiment of the present invention. The base station 100 in FIG. 1 includes a control module 101 and a data processing module 102.

The control module 101 is connected to a control module of at least one other base station by using a first logical interface, and performs control plane interaction during inter-base station coordination. The data processing module 102 is connected to the control module 101, is connected to a data processing module of the at least one other base station by using a second logical interface, and performs user plane interaction during the inter-base station coordination.

The base station in this embodiment of the present invention is provided with the first logical interface and the second logical interface to respectively implement the control plane interaction and the user plane interaction between base stations, so that the inter-base station coordination can be accomplished.

It should be noted that in this embodiment of the present invention, the logical interface refers to a virtual functional interface, and a physical interface refers to a hardware interface. The logical interface may be established based on a physical interface and/or an internal connection path.

Optionally, the control module 101 and the data processing module 102 may be resident in different independent devices. For example, the control module 101 may be implemented by a base station controller, such as a base station controller (BSC) in 2G or an radio network controller (RNC) in 3G; and the data processing module 102 may be implemented by a baseband processing part of the base station, such as a BTS in 2G or a NodeB in 3G.

As another embodiment, the control module 101 and the data processing module 102 may be co-located in a same device. For example, the control module 101 may be implemented by a control module (CTRL) of an eNB, and the data processing module 102 may be implemented by an air-interface baseband link layer processing module (L2) and an air-interface physical layer processing module (L1) of the eNB. This embodiment of the present invention imposes no limitation on a specific implementation form of the control module 101 and the data processing module 102.

Optionally, as an embodiment, the inter-base station coordination may include at least one of the following: SFN, CoMP, and CA. In the prior art, SFN, CoMP and CA can only be implemented between multiple cells controlled by a same base station, and cannot be implemented between different independent base stations. An independent base station refers to a base station that is not controller by another base station. For example, in the prior art, in a homogeneous network, SFN, CoMP, or CA can be implemented between multiple cells (or sectors) controlled by a same base station; or, in a heterogeneous network, SFN, CoMP, or CA can be implemented between multiple cells in a coverage area of one macro base station, where the multiple cells in the coverage area of the one macro base station may include a cell served by the macro base station and a cell served by a micro base station controlled by the macro base station. By introducing the first logical interface and the second logical interface, this embodiment of the present invention allows inter-base station coordination between independent base stations, to be specific, SFN, CoMP, or CA coordination or the like can be implemented between cells of different independent base stations. This embodiment of the present invention imposes no limitation on a specific form of the inter-base station coordination, and is also applicable to another form of inter-base station coordination.

It should be noted that in this embodiment of the present invention, for simplicity, a cell and a sector are collectively called "a cell". And, a cell in this embodiment of the present invention includes a physical cell, and also includes a virtual logical cell.

In addition, a relationship between cell instances in a scenario of inter-base station coordination is different than a relationship between "common cells". The so-called common cell may include instances of different levels, such as a CTRL, an L2, an L1, an air-interface radio frequency (RF) processing module. The CTRL of each common cell controls the L2, the L1, and the RF of the respective common cell, but the inter-base station coordination such as SFN, CoMP, or CA may implement control between instances of different cells.

FIG. 2A to FIG. 2D are schematic diagrams illustrating examples of relationships between cell instances. With reference to FIG. 2A to FIG. 2D, the following describes more clearly a difference between a cell instance in an SFN, CoMP, or CA scenario and a common cell. In FIG. 2A to FIG. 2D, connection lines between instances indicate a control relationship between corresponding instances.

Figure 2A:
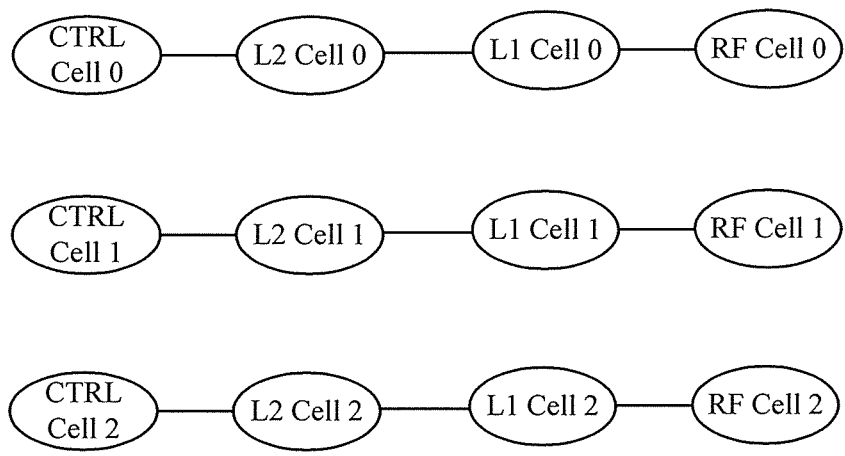
FIG. 2A to FIG. 2D are schematic diagrams illustrating examples of relationships between cell instances.

FIG. 2A is a schematic diagram of instances of common cells. Three cells Cell 0-2 are used as an example, and for simplicity, control connection lines between a CTRL and both an L1 and an RF are not shown.

As shown in FIG. 2A, a CTRL of each of common cell among Cells 0-2 controls only an L1, an L2, and an RF of the respective common cell.

Figure 2B:
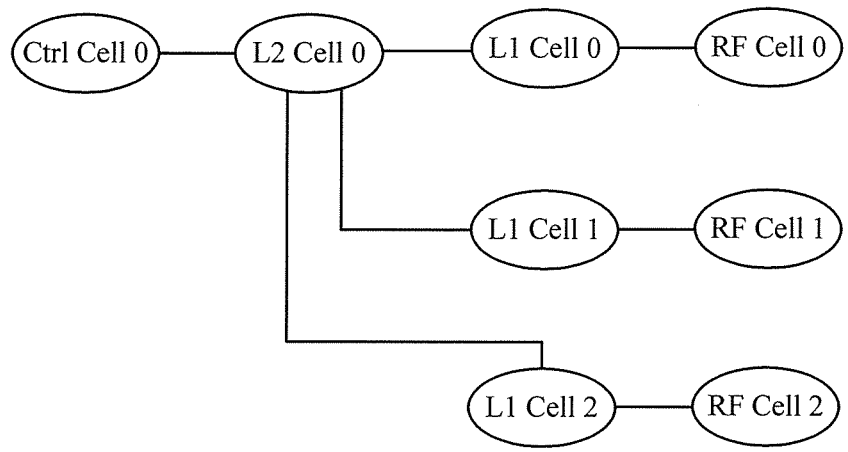

FIG. 2B is a schematic diagram of instances of an SFN cell. It can be understood that an SFN cell is a combination of multiple common cells. Assignment of RF and L1 instances the multiple common cells does not change in the SFN scenario is, but L2 and signaling of the multiple common cells are treated as belonging to a single cell when they are being processed. In this way, centralized control and a coordination function can be implemented.

Figure 2C:
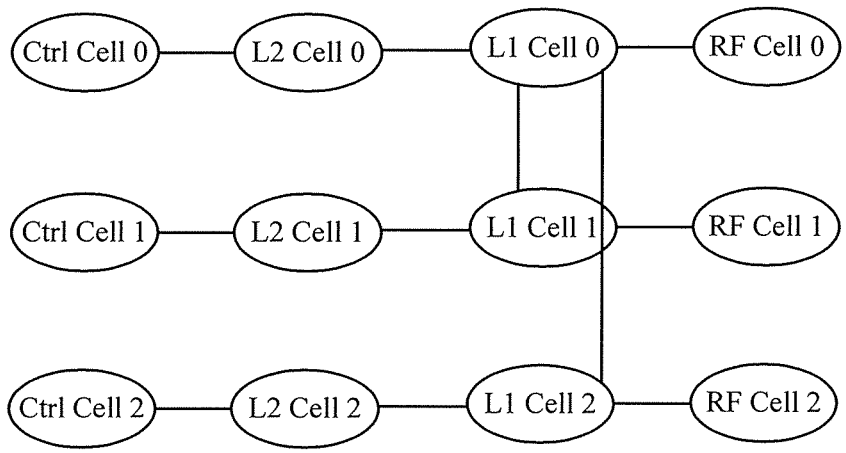

FIG. 2C is a schematic diagram of instances of CoMP cells. It can be understood that, a CoMP cell is still based on common cells, but coordination between L1 instances of cells is added.

Figure 2D:
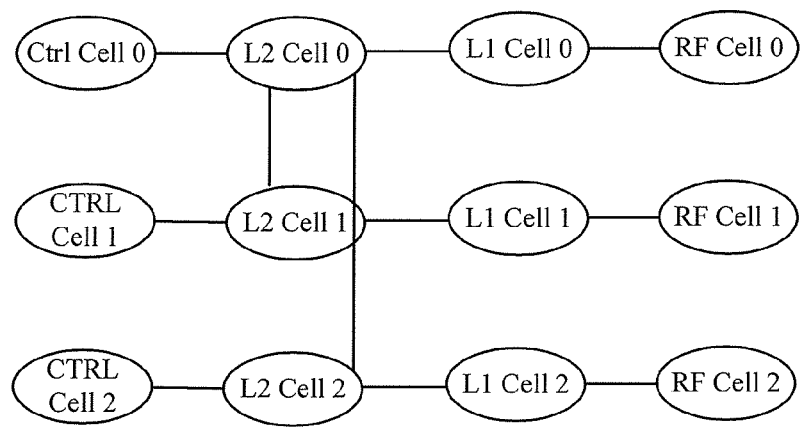

FIG. 2D is a schematic diagram of instances of CA cells. It can be understood that, a CA cell is also based on common cells, but coordination between L2 instances of cells is added.

Figure 3:
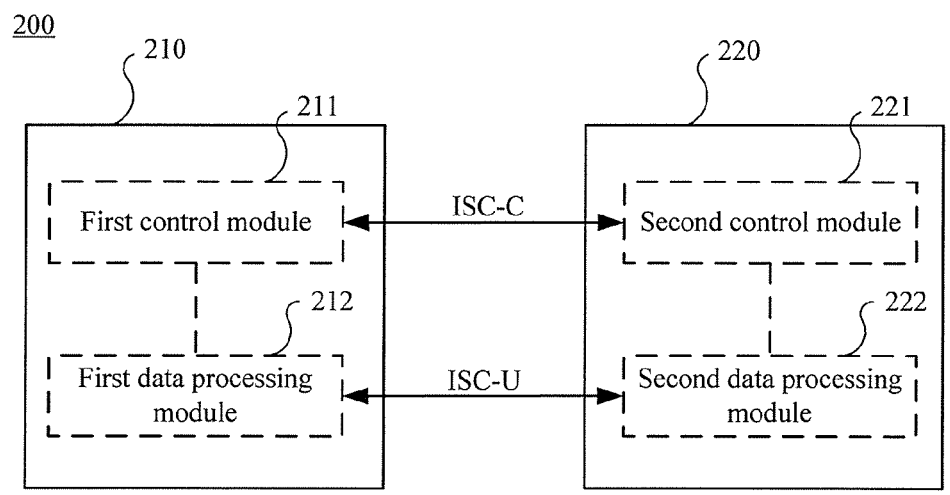
FIG. 3 is a schematic block diagram of a network system according to an embodiment of the present invention.

FIG. 3 is a schematic block diagram of a network system according to an embodiment of the present invention. The network system 200 in FIG. 3 includes a first base station 210 and a second base station 220. However, no limitation is imposed on a quantity of base stations included in the network system 200. In this embodiment, the first base station 210 and the second base station 220 are only used as an example for description.

A first logical interface ISC-C and a second logical interface ISC-U are present between the first base station 210 and the second base station 220. The first logical interface ISC-C is configured to perform control plane interaction during inter-base station coordination, and the second logical interface ISC-U is configured to perform user plane interaction during inter-base station coordination.

The base station in this embodiment of the present invention is provided with the first logical interface and the second logical interface to respectively implement control plane interaction and user plane interaction between base stations, so that inter-base station coordination can be accomplished.

Optionally, each base station 210 or 220 may be implemented by a base station system 100 in FIG. 1. Specifically, as shown in dashed boxes in FIG. 3, the first base station 210 may include a first control module 211 and a first data processing module 212, and the second base station 220 may include a second control module 221 and a second data processing module 222.

As shown in FIG. 3, the first logical interface ISC-C may be an interface between the first control module 211 and the second control module 221, and the second logical interface ISC-U may be an interface between the first data processing module 212 and the second data processing module 222.

Figure 4:
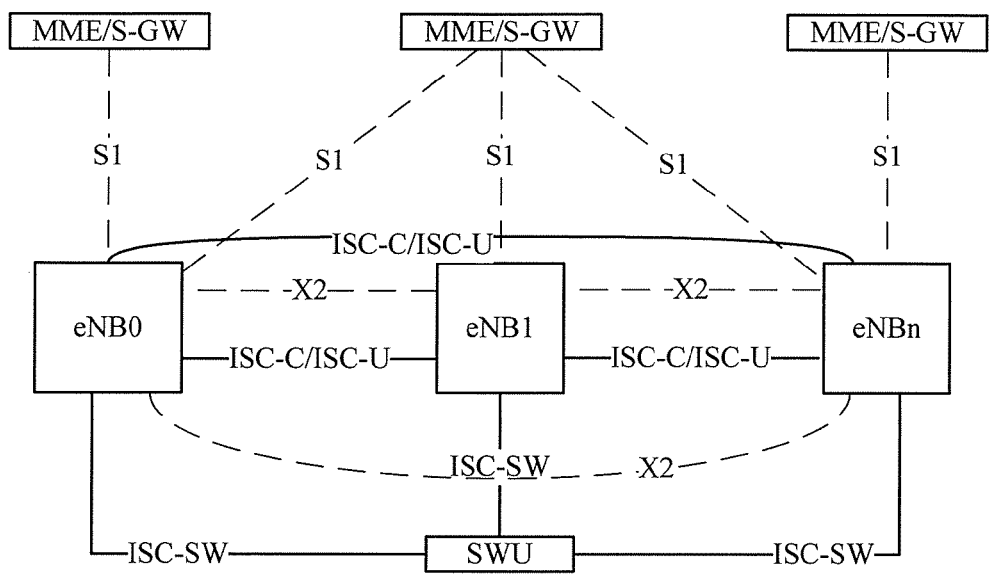
FIG. 4 is a schematic diagram depicting an application architecture of a network system according to an embodiment of the present invention.

FIG. 4 is a schematic diagram depicting an application architecture of a network system according to an embodiment of the present invention. An LTE network is used as an example in this embodiment. For illustrative purposes, three base stations eNB0, eNB1, and eNBn in an LTE architecture are shown in FIG. 4. Each base station may be implemented by a base station 100 in FIG. 1 or a base station 210/220 in FIG. 3. No limitation is imposed on a quantity of base stations included in the network system in this embodiment of the present invention, and the network system is not limited to be applicable to LTE. In the following, the base stations eNB0, eNB1, and eNBn may be collectively called an eNB, if they do not need to be distinguished from each other.

As shown in FIG. 4, the base stations eNB0, eNB1, and eNBn are provided with a first logical interface ISC-C and a second logical interface ISC-U to respectively implement control plane interaction and user plane interaction during inter-base station coordination between corresponding base stations.

This embodiment of the present invention imposes no limitation on the way in which the logical interface ISC-C or ISC-U is implemented. For example, the logical interfaces ISC-C and ISC-U may be established based on a physical interface between base stations, where the physical interface is used for a direct connection. The physical interface that is used for a direct connection may be a newly-added dedicated physical interface or an existing physical interface. As another embodiment, the network system in FIG. 4 further includes a switch unit (SWU) that is connected to the eNB by using a physical interface ISC-SW and that is configured to provide routing service and switching service for the control plane interaction and the user plane interaction. In other words, the first logical interface ISC-C and the second logical interface ISC-U may be based on the physical interface ISC-SW. The SWU may be a logical unit, and for example, the SWU may be implemented as a stand-alone switch device, or implemented as a subsystem that is formed by a group of switch devices, or deployed on an existing network element. This embodiment of the present invention imposes no limitation on an implementation form of the SWU, provided that the SWU is able to offer routing service and switching service for the control plane interaction and the user plane interaction between the base stations eNBs.

This embodiment of the present invention imposes no limitation on the way in which a physical interface is implemented. For example, a physical interface may be implemented in a wired manner, such as an optical fiber and a conductive cable, or may be implemented in a wireless manner, such as Bluetooth, infrared, and radio frequency. This embodiment of the present invention imposes no limitation on a communications protocol used by a physical interface, and for example, the internet protocol (IP), an asynchronous transfer mode (ATM) protocol, a rapid input/output (Rapid IO) protocol, a common public radio interface (CPRI) protocol and the like may be used.

In addition to the above, as shown in FIG. 4, an S1 interface is an interface between the base station and a core network. The S1 interface may include a control plane interface S1-MME that is configured to interface with an MME. The S1 interface may further include a user plane interface S1-U that is configured to interface with an S-GW. Further, an X2 interface may also reside between the base stations, where the X2 interface is configured to perform handover processing between the base stations, and includes a control plane interface X2AP and a user plane interface X2-U.

The base stations in this embodiment of the present invention are each provided with a first logical interface ISC-C and a second logical interface ISC-U to respectively implement control plane interaction and user plane interaction during inter-base station coordination between base stations, so that the inter-base station coordination can be accomplished. In particular, this embodiment of the present invention is compatible with a variety of interfaces in existing architectures, and thereby is easy to practice.

Figure 5:
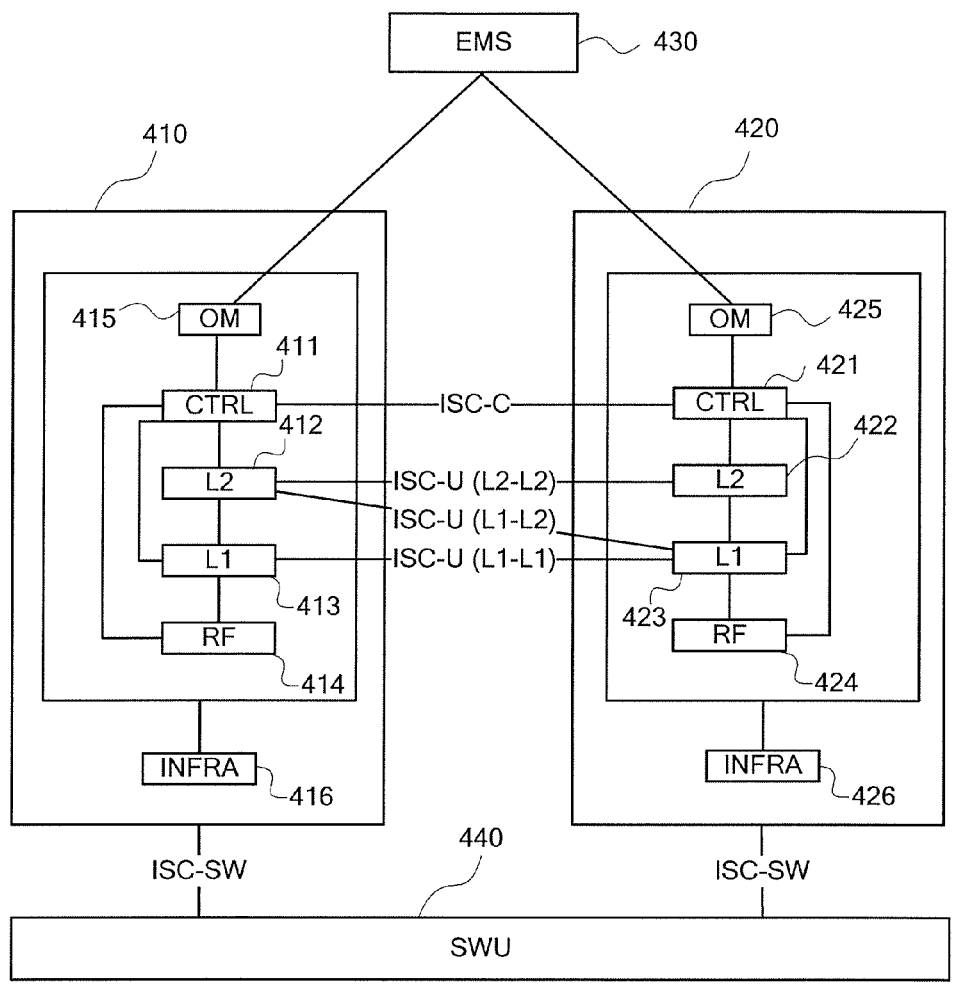
FIG. 5 is a schematic diagram of a network system according to an embodiment of the present invention.

FIG. 5 is a schematic diagram of a network system according to an embodiment of the present invention. In the network system in FIG. 5, an LTE base station is used as an example to describe an internal architecture of a base station in an illustrative sense. This embodiment of the present invention is not limited to be applicable to LTE. For simplicity, only two base stations 410 and 420 are shown in FIG. 5, but a quantity of base stations that can be applied to this embodiment of the present invention is not limited.

The base stations 410 and 420 may be implemented by a base station system 100 in FIG. 1 or by base stations 110 and 120 in FIG. 3. As shown in FIG. 5, the base station 410 includes a control module CTRL 411, an air-interface baseband link layer processing module L2 412, and an air-interface physical layer processing module L1 413; and the base station 420 includes a control module CTRL 421, an air-interface baseband link layer processing module L2 422, and an air-interface physical layer processing module L1 423. The air-interface baseband link layer processing module L2 412 and the air-interface physical layer processing module L1 413 may be corresponding to the data processing module 102 in FIG. 1, the first data processing module 212 in FIG. 3, or the second data processing module 222 in FIG. 3. Alternatively, the air-interface baseband link layer processing module L2 422 and the air-interface physical layer processing module L1 423 may be corresponding to the data processing module 102 in FIG. 1, the first data processing module 212 in FIG. 3, or the second data processing module 222 in FIG. 3. The control module CTRL 411 and the control module CTRL 421 may be corresponding to a control module 101 in FIG. 1, a first control module 211 in FIG. 3, or a second control module 221 in FIG. 3.

In addition, the CTRLs 411 and 421 may include an air-interface layer 3 signaling processing function, an S1 interface signaling processing function, and a base station service control function. The L2s 412 and 422 are responsible for air-interface baseband link layer processing, and the L1s 413 and 423 are responsible for air-interface physical layer processing. The base station 410 may further include an air-interface radio frequency (RF) processing module 414, and the base station 420 may further include an RF 424. The RFs 414 and 424 are responsible for air-interface radio frequency processing.

In an LTE system architecture, the base station 410 includes an operation and maintenance (OM) module 415, and the base station 420 includes an OM 425. The OMs 415 and 425 are connected to an external element management system (EMS) 430, and manage the CTRL modules according to a command sent by the EMS 430. A management interface between the OMs and the EMS may be implemented in accordance with the prior art, and therefore are not described in detail herein.

Moreover, the base station 410 includes an INFRA (INFRAstructure, basic function module) 416, and the base station 420 includes an INFRA 426. The INFRAs 416 and 426 are connected to internal modules such as the CTRL, the L2, the L1, and the RF. For simplicity, connection lines between them are not shown in FIG. 4. The INFRA 416 is further connected to an external switch unit SWU 440 through a physical interface ISC-SW, where the SWU 440 provides routing service and switching service for control plane interaction and user plane interaction between the base stations.

As shown in FIG. 5, a logical interface ISC-C is present between the CTRL 411 of the base station 410 and the CTRL 421 of the base station 420, and the logical interface ISC-C is configured to implement control plane interaction during inter-base station coordination between the base stations 410 and 420. In other words, the logical interface ISC-C may be corresponding to the first logical interface in FIG. 1. Specifically, the ISC-C interface may be implemented based on an internal path between the CTRL 411 and the INFRA 416, an internal path between the CTRL 421 and the INFRA 426, the physical interface ISC-SW between the SWU 440 and the INFRA 416, and a physical interface ISC-SW between the SWU 440 and the INFRA 426.

A logical interface ISC-U (L2-L2) is present between the L2 412 of the base station 410 and the L2 422 of the base station 420, and is configured to implement user plane interaction during inter-base station coordination between the base stations 410 and 420. In other words, the logical interface ISC-U may be corresponding to the second logical interface in FIG. 1. Specifically, the ISC-U (L2-L2) interface is used for user plane interaction of CA coordination between the base stations 410 and 420. For example, the ISC-U (L2-L2) interface may be implemented based on an internal path between the L2 412 and the INFRA 416, an internal path between the L2 422 and the INFRA 426, the physical interface ISC-SW between the SWU 440 and the INFRA 416, and the physical interface ISC-SW between the SWU 440 and the INFRA 426.

A logical interface ISC-U (L1-L2) is present between the L2 412 of the base station 410 and the L1 423 of the base station 420, and is configured to implement user plane interaction during inter-base station coordination between the base stations 410 and 420. Specifically, the ISC-U (L1-L2) interface is configured to implement user plane interaction of SFN coordination between the base stations 410 and 420. For example, the ISC-U (L1-L2) interface may be implemented based on the internal path between the L2 412 and the INFRA 416, an internal path between the L1 423 and the INFRA 426, the physical interface ISC-SW between the SWU 440 and the INFRA 416, and the physical interface ISC-SW between the SWU 440 and the INFRA 426.

A logical interface ISC-U (L1-L1) is present between the L1 413 of the base station 410 and the L1 423 of the base station 420, and is configured to implement user plane interaction during inter-base station coordination between the base stations 410 and 420. Specifically, the ISC-U (L1-L1) interface is configured to implement user plane interaction of CoMP coordination between the base stations 410 and 420. For example, the ISC-U (L1-L1) interface may be implemented based on an internal path between the L1 413 and the INFRA 416, the internal path between the L1 423 and the INFRA 426, the physical interface ISC-SW between the SWU 440 and the INFRA 416, and the physical interface ISC-SW between the SWU 440 and the INFRA 426.

In this way, this embodiment of the present invention exploits a coordination interface between base stations to support inter-base station coordination, thereby facilitating flexibility in deploying services such as SFN, CoMP, and CA. Further to be above, a base station architecture in this embodiment of the present invention is compatible with an existing architecture, and is thereby easy to implement.

Figure 6:
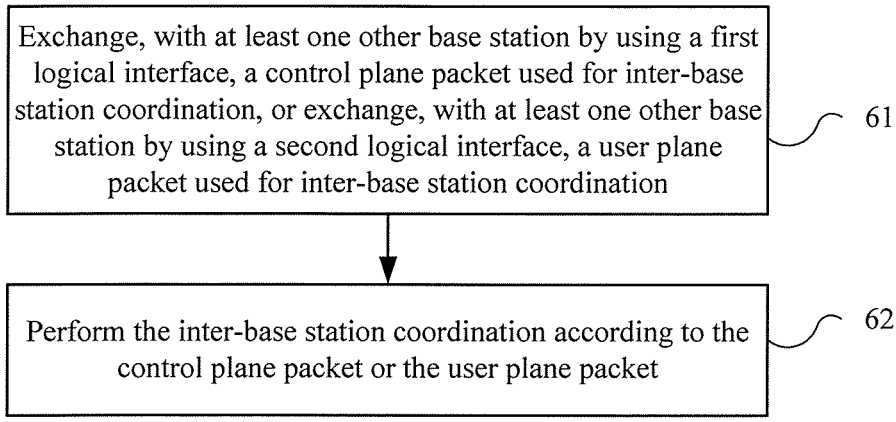
FIG. 6 is a schematic flowchart of a communication method according to an embodiment of the present invention.

FIG. 6 is a schematic flowchart of a communication method according to an embodiment of the present invention. The method in FIG. 6 is implemented by a base station, such as the base station 100 shown in FIG. 1.

61: Exchange, with at least one other base station by using a first logical interface, a control plane packet used for inter-base station coordination, or exchange, with at least one other base station by using a second logical interface, a user plane packet used for inter-base station coordination.

This embodiment of the present invention imposes no limitation on a specific protocol employed by the control plane packet or the user plane packet used for inter-base station coordination.

62: Perform inter-base station coordination according to the control plane packet or the user plane packet.

Optionally, as an embodiment, the inter-base station coordination may include at least one of the following: SFN, CoMP, and CA. However, this embodiment of the present invention imposes no limitation on a specific form of inter-base station coordination, and is also applicable to another form of inter-base station coordination.

The base station in this embodiment of the present invention is provided with the first logical interface and the second logical interface to respectively implement control plane interaction and user plane interaction between base stations, so that inter-base station coordination can be accomplished.

Interaction between two base stations includes a case in which a first base station sends a packet to a second base station and/or a case in which the second base station sends a packet to the first base station. Optionally, as an embodiment, in step 61, when the control plane packet used for inter-base station coordination is exchanged with at least one other base station by using the first logical interface, or when the user plane packet used for inter-base station coordination is exchanged with at least one other base station by using the second logical interface, the control plane packet or the user plane packet may be sent to a switch unit, so that the switch unit forwards the control plane packet or the user plane packet to the at least one other base station.

Optionally, as another embodiment, control plane packet or user plane packet that is sourced from the at least one other base station and forwarded by the switch unit may be received.

For example, the switch unit may be the SWU in FIG. 4 or FIG. 5, and provides routing service and switching service between base stations. The SWU is connected to the two base stations by using a physical interface, and the first logical interface and the second logical interface may be implemented based on the physical interface.

This embodiment of the present invention imposes no limitation on a form of a base station address carried in the control plane packet or in the user plane packet. For example, the base station address may be a destination address (an IP address or a Rapid IO address) of a packet receiver, or may be an address in another form, provided that the receiver can be addressed on a network. In addition, optionally, the control plane packet or the user plane packet may further carry an address of a packet sender as source address information.

The method in FIG. 6 may be implemented by the base station in FIG. 1. To avoid repetition in this specification, details are not described herein again. The following describes an exemplary process for the communication method of this embodiment of the present invention with reference to a specific example. It should be noted that although the following embodiments are described by using an LTE system as an example, these embodiment of the present invention are not limited to LTE, and may also be applied to another system in a similar manner without departing from the scope of the embodiments of the present invention.

Figure 7:
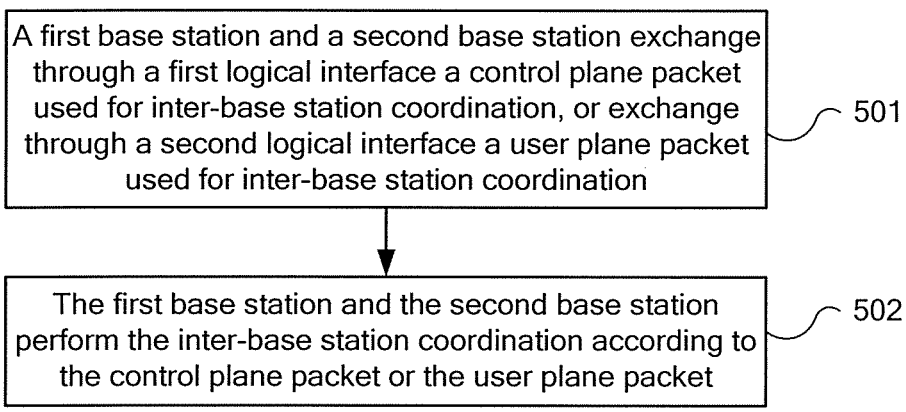
FIG. 7 is a schematic flowchart of a communication method according to an embodiment of the present invention.

FIG. 7 is a schematic flowchart of a communication method according to an embodiment of the present invention. The communication method in FIG. 7 may be performed by a network system, where the network system includes a first base station and a second base station.

501: The first base station and the second base station exchange through a first logical interface a control plane packet used for inter-base station coordination, or exchange through a second logical interface to a user plane packet used for inter-base station coordination.

This embodiment of the present invention imposes no limitation on a specific protocol employed by the control plane packet or the user plane packet used for inter-base station coordination.

502: The first base station and the second base station perform inter-base station coordination according to the control plane packet or the user plane packet.

Optionally, as an embodiment, the inter-base station coordination may include at least one of the following: SFN, CoMP, and CA. However, this embodiment of the present invention imposes no limitation on a specific form of inter-base station coordination, and is also applicable to another form of inter-base station coordination.

The base stations in this embodiment of the present invention are each provided with the first logical interface and the second logical interface to respectively implement control plane interaction and user plane interaction between base stations, so that inter-base station coordination can be accomplished.

Interaction between the two base stations includes a case in which the first base station sends a packet to the second base station and/or a case in which the second base station sends a packet to the first base station. Optionally, as an embodiment, when the first base station sends a packet to the second base station, the first base station may send the control plane packet or the user plane packet to a switch unit, where the control plane packet or the user plane packet carries an address of the second base station; and the switch unit may forward the control plane packet or the user plane packet to the second base station according to the address of the second base station carried in the control plane packet or the user plane packet.

Optionally, as another embodiment, the second base station may send a control plane packet or a user plane packet to the switch unit, where the control plane packet or the user plane packet carries an address of the first base station; and the switch unit may forward the control plane packet or the user plane packet to the first base station according to the address of the first base station carried in the control plane packet or the user plane packet.

For example, the switch unit may be the SWU in FIG. 4 or FIG. 5, and provides routing service and switching service between base stations. The SWU is connected to the two base stations by using a physical interface, and the first logical interface and the second logical interface may be implemented based on the physical interface.

This embodiment of the present invention imposes no limitation on a form of a base station address carried in the control plane packet or in the user plane packet. For example, the base station address may be a destination address (an IP address or a Rapid IO address) of a packet receiver, or may be an address in another form, provided that the receiver can be addressed on a network. In addition, optionally, the control plane packet or the user plane packet may further carry an address of a packet sender as source address information.

The method in FIG. 7 may be implemented by the network system in FIG. 3 to FIG. 5. To avoid repetition in this specification, details are not described herein again. The following describes an exemplary process for the communication method of the embodiment of the present invention with reference to a specific example. It should be noted that although the following embodiments are described by using an LTE system as an example, these embodiment of the present invention are not limited to LTE, and may also be applied to another system in a similar manner without departing from the scope of the embodiments of the present invention.

Figure 8:
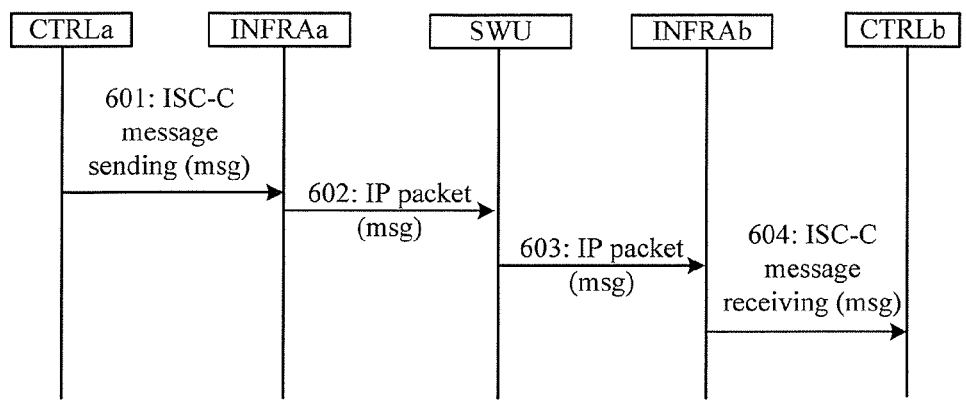
FIG. 8 is a schematic flowchart of a network system communication process according to an embodiment of the present invention.

FIG. 8 is a schematic flowchart of a network system communication process according to an embodiment of the present invention. The communication process in FIG. 8 is used to implement control plane communication of inter-base station coordination.

601: When a first base station eNBa needs to send an ISC control plane message msg used for inter-base station coordination to a second base station eNBb, a CTRL module (CTRLa) of the first base station eNBa accesses a message sending function ISC-C Msg Send provided by an INFRA module (INFRAa) of the eNBa, and sends the control plane message msg and an address of the second base station eNBb (such as an IP address of the second base station eNBb) to the INFRAa. Optionally, an address of the first base station eNBa may further be sent.

602: The INFRAa generates a control plane packet (for example, in the form of an IP packet) according to information provided by the CTRLa, where the control plane packet carries at least the msg and the address of the second base station. The msg may be carried in a payload of the IP packet, and the address of the second base station may be used as a destination address of the IP packet. Then, the INFRAa sends the IP packet to an SWU by using an ISC-SW interface.

603: After performing routing and switching, the SWU forwards the IP packet to an INFRA module (INFRAb) of the eNBb.

604: The INFRAb of the eNBb extracts the msg in the IP packet by using a message receiving function ISC-C Msg Recv, and submits the msg to a CTRL module (CTRLb) of the eNBb.

In this way, transmission of the control plane message msg from the eNBa to the eNBb is implemented. A manner for transmitting a control plane message msg from the eNBb to the eNBa is similar as from the eNBa to the eNBb. Therefore, control plane interaction during inter-base station coordination is implemented between the eNBa and the eNBb.

This embodiment of the present invention imposes no limitation on a specific protocol of the control plane interaction. Another packet switching technology other than the IP switching technology may be used, such as ATM, without departing from the scope of this embodiment of the present invention.

This embodiment of the present invention imposes no limitation on specific content of the control plane packet. For example, the control plane packet may be an activate cell message or an activate cell response message. The activate cell message carries information about a cell that needs to be activated, such as a cell identifier. The activate cell response message carries information about an activated cell. Alternatively, the control plane packet may be a cell state report message, and carries cell information of a sender from which the control plane packet is sourced.

Figure 9:
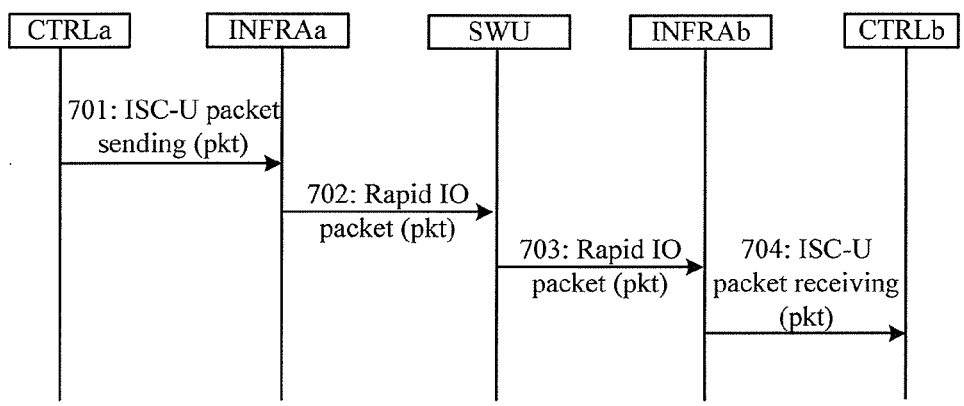
FIG. 9 is a schematic flowchart of a network system communication process according to another embodiment of the present invention.

FIG. 9 is a schematic flowchart of a network system communication process according to another embodiment of the present invention. The communication process in FIG. 9 is used to implement user plane communication of inter-base station coordination.

701: When a first base station eNBa needs to send an ISC user plane data pkt used for inter-base station coordination to a second base station eNBb, a data processing module (L1/L2a) of the first base station eNBa accesses a packet sending function ISC-U Packet Send provided by an INFRA module (INFRAa) of the eNBa, and sends the pkt and an address of the second base station, such as a Rapid IO address, to the INFRAa. Optionally, the L1/L2a may further send an address of the first base station to the INFRAa.

702: The INFRAa module sends a Rapid IO packet to an SWU by using an ISC-SW interface, where the Rapid IO packet carries at least the pkt and the address of the second base station.

703: After performing routing and switching, the SWU forwards the Rapid IO packet to an INFRA module (INFRAb) of the eNBb.

704: The INFRAb of the eNBb extracts the pkt by using a packet receiving function ISC-U Packet Recv, and submits the pkt to a corresponding data processing module (L1/L2b) of the eNBb.

In this way, transmission of user plane data pkt from the eNBa to the eNBb is implemented. A manner for transmitting user plane data pkt from the eNBb to the eNBa is similar as from the eNBa to the eNEb. Therefore, user plane interaction during inter-base station coordination is implemented between the eNBa and the eNBb.

This embodiment of the present invention imposes no limitation on a specific protocol of the user plane interaction. Another speed real-time packet switching technology other than the Rapid IO switching technology may be used, such as a CPRI technology, without departing from the scope of this embodiment of the present invention.

Figure 10:
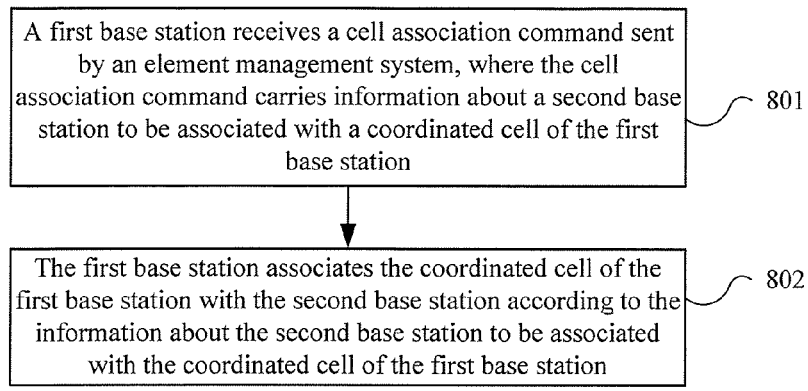
FIG. 10 is a flowchart of a cell configuration method according to an embodiment of the present invention.

FIG. 10 is a flowchart of a cell configuration method according to an embodiment of the present invention. The method in FIG. 10 is performed by a base station.

801: A first base station receives a cell association command sent by an element management system, where the cell association command carries information about a second base station to be associated with a coordinated cell of the first base station.

Optionally, as an embodiment, the coordinated cell may be an SFN cell, a CoMP cell, or a CA cell involved in inter-base station coordination. This embodiment of the present invention imposes no limitation on a specific form of inter-base station coordination.

Optionally, as another embodiment, the information about the second base station may be an identifier of the second base station.

802: The first base station associates the coordinated cell of the first base station with the second base station according to the information about the second base station to be associated with the coordinated cell of the first base station.

In this way, cell association configuration during inter-base station coordination can be implemented.

Figure 11:
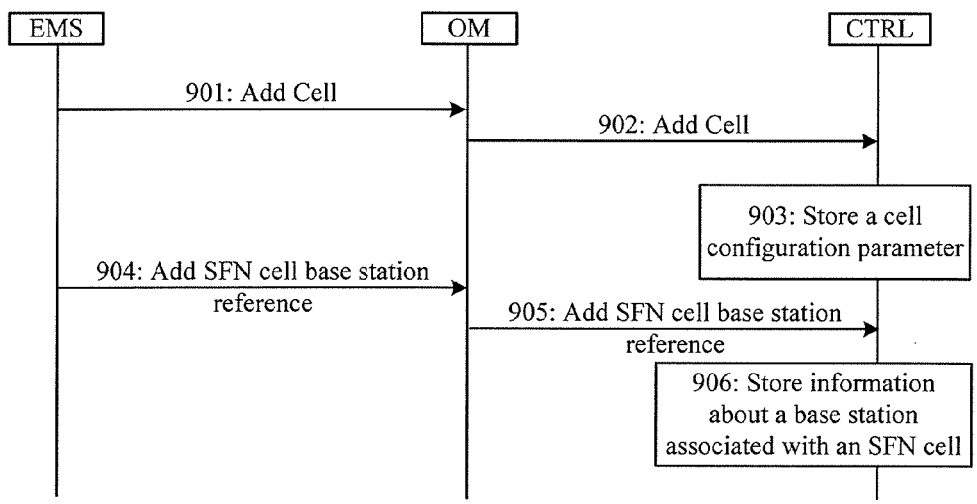
FIG. 11 is a schematic flowchart of a cell configuration process according to an embodiment of the present invention.

FIG. 11 is a schematic flowchart of a cell configuration process according to an embodiment of the present invention. The embodiment in FIG. 11 is applied to inter-base station SFN coordination.

901: An EMS sends an add cell (Add Cell) command to an OM of abase station (hereinafter called a central control base station) in which a central control point is located, where the add cell command carries a cell configuration parameter. The add cell command may accord with the prior art, and for example, the cell configuration parameter may carry basic configuration information of a cell (such as a frequency channel number, a bandwidth, and a power)

902: The OM of the central control base station processes the add cell command, converts the add cell command to an internal message, and forwards the internal message to a CTRL.

903: The CTRL of the base station stores the cell configuration parameter.

904: The EMS sends an add SFN cell base station reference (Add SfnCellEnbRef) command to the central control base station, so as to associate an SFN cell with at least one other base station, where the Add SfnCellEnbRef command may carry information about the at least one other base station corresponding to the SFN cell, such as an identifier of the at least one other base station. The Add SfnCellEnbRef command is an example of a cell association command in FIG. 10.

905: The OM of the central control base station processes the add SFN cell base station reference command, converts the add SFN cell base station reference command to an internal message, and forwards the internal message to the CTRL.

906: The CTRL stores the information about the at least one other base station associated with the SFN cell.

In this way, cell configuration processing during SFN coordination is implemented. The foregoing add cell command and add SFN cell base station reference command may be collectively called a cell configuration command.

Figure 12:
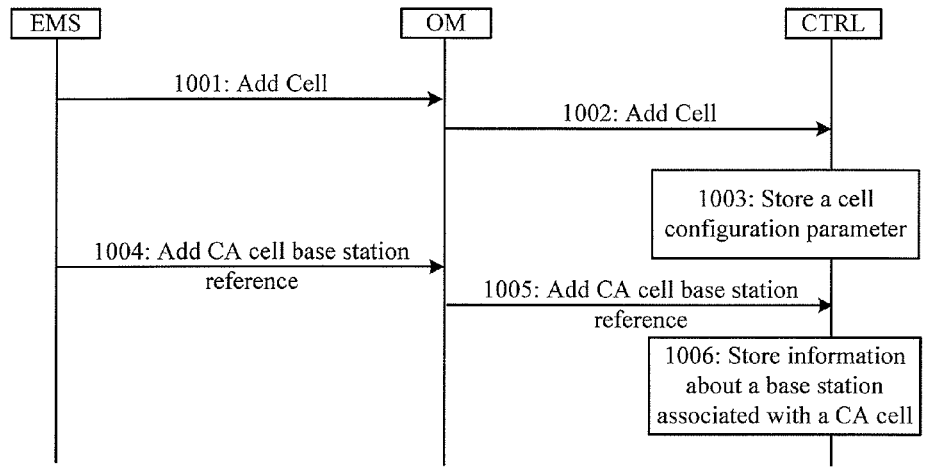
FIG. 12 is a schematic flowchart of a cell configuration process according to another embodiment of the present invention.

FIG. 12 is a schematic flowchart of a cell configuration process according to another embodiment of the present invention. The embodiment in FIG. 12 is applied to inter-base station CA coordination, and the process in FIG. 12 is performed for each base station on a component carrier of CA.

1001: An EMS sends an add cell (Add Cell) command to a base station, where the add cell command carries a cell configuration parameter (such as a frequency channel number, a bandwidth, and a power).

1002: An OM of the base station processes the add cell command, converts the add cell command to an internal message, and forwards the internal message to a CTRL.

1003: The CTRL stores the cell configuration parameter.

1004: The EMS sends an add CA cell base station reference (Add CaCellEnbRef) command to the base station, so as to associate a CA cell with at least one other base station, where the Add CaCellEnbRef command may carry information about the at least one other base station, such as an identifier of the at least one other base station. The Add CaCellEnbRef command is an example of a cell association command in FIG. 10.

1005: The OM of the base station processes the Add CaCellEnbRef command, converts the Add CaCellEnbRef command to an internal message, and forwards the internal message to the CTRL.

1006: The CTRL stores the information about the at least one other base station associated with the CA cell.

In this way, cell configuration processing of CA coordination is implemented. The foregoing add cell command and add CA cell base station reference command may be collectively called a cell configuration command.

Figure 13:
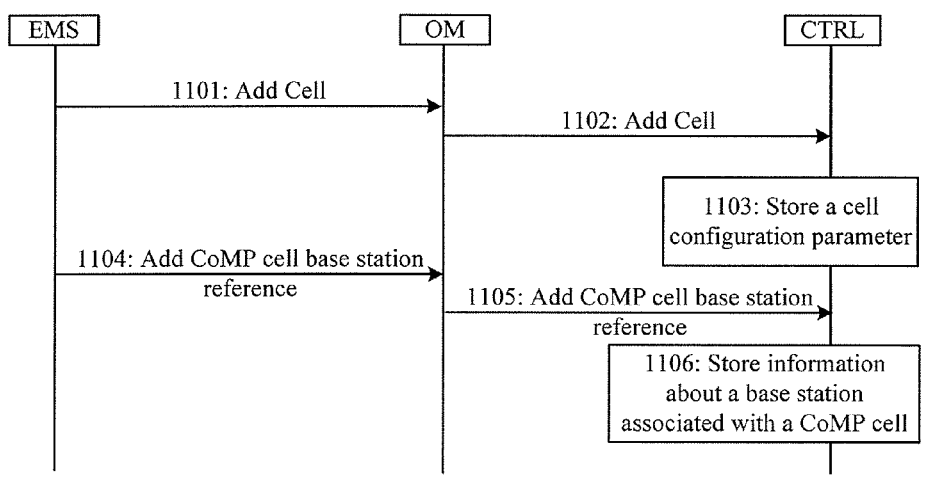
FIG. 13 is a schematic flowchart of a cell configuration process according to another embodiment of the present invention.

FIG. 13 is a schematic flowchart of a cell configuration process according to another embodiment of the present invention. The embodiment in FIG. 13 is applied to inter-base station CoMP coordination, and the process in FIG. 13 is performed for each base station participating in CoMP.

1101: An EMS sends an add cell (Add Cell) command to a base station, where the add cell command carries a cell configuration parameter (such as a frequency channel number, a bandwidth, and a power).

1102: An OM of the base station processes the add cell command, converts the add cell command to an internal message, and forwards the internal message to a CTRL.

1103: The CTRL stores the cell configuration parameter.

1104: The EMS sends an add CoMP cell base station reference (Add CompCellEnbRef) command to the base station, so as to associate a CoMP cell with at least one other base station, where the Add CompCellEnbRef command may carry information about the at least one other base station, such as an identifier of the at least one other base station. The Add CompCellEnbRef command is an example of a cell association command in FIG. 10.

1105: The OM of the base station processes the Add CompCellEnbRef command, converts the Add CompCellEnbRef command to an internal message, and forwards the internal message to the CTRL.

1106: The CTRL stores the information about the at least one other base station associated with the CoMP cell.

In this way, cell configuration processing of CoMP coordination is implemented. The foregoing add cell command and add CoMP cell base station reference command may be collectively called a cell configuration command.

Figure 14:
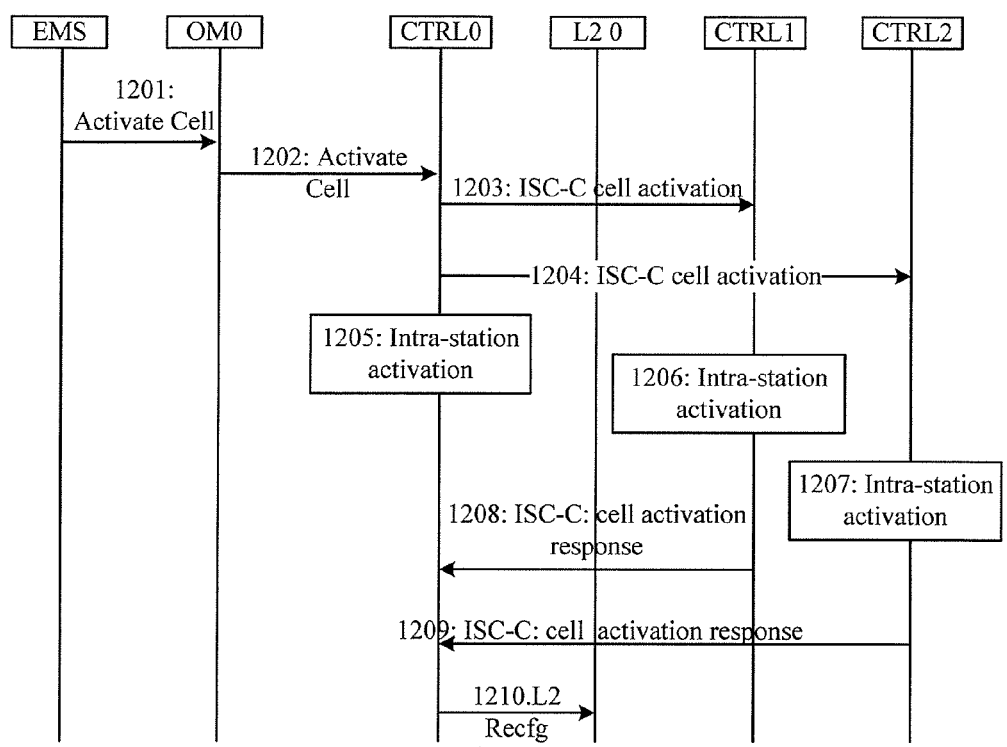
FIG. 14 is a schematic flowchart of a cell activation process according to an embodiment of the present invention.

FIG. 14 is a schematic flowchart of a cell activation process according to an embodiment of the present invention. The process in FIG. 14 may be applied to SFN coordination. In the embodiment in FIG. 14, it is assumed that a central control base station is an eNB0, other associated base stations are an eNB1 and an eNB2. However, this embodiment of the present invention imposes no limitation on a quantity of base stations involved in SFN coordination.

1201: An EMS sends an activate cell (Activate Cell) command to an OM (OM0) of the central control base station eNB0. The activate cell command may accord with the prior art, and therefore details are not described herein again.

1202: The OM0 of the eNB0 processes the activate cell command, converts the activate cell command to an internal message, and forwards the internal message to a CTRL module (CTRL0) of the eNB0.

1203: The CTRL0 sends an ISC-C cell activation message to a CTRL module (CTRL1) of the eNB1 by using an ISC-C interface, where the ISC-C cell activation message carries a cell configuration parameter and cell information (such as an address of an L2 cell instance of the eNB0) of a sender from which the control plane packet is sourced.

1204: The CTRL0 sends the ISC-C cell activation message to a CTRL module (CTRL2) of the eNB2 by using the ISC-C interface, where the ISC-C cell activation message carries the cell configuration parameter and the cell information (such as the address of the L2 cell instance of the eNB0) of the sender from which the control plane packet is sourced.

Steps 1203 and 1204 may be performed according to the process in FIG. 8.

1205: The eNB0 performs processing according to an intra-station activation process, where the CTRL module (CTRL0) of the eNB0 sends the address of the L2 cell instance of the eNB0 to an L1 cell instance of the eNB0.

1206: The eNB1 performs processing according to the intra-station activation process, where the CTRL module (CTRL1) of the eNB1 sends the address of the L2 cell instance of the eNB0 to an L1 cell instance of the eNB1.

1207: The eNB2 performs processing according to the intra-station activation process, where the CTRL module (CTRL2) of the eNB2 sends the address of the L2 cell instance of the eNB0 to an L1 cell instance of the eNB2.

1208: The CTRL1 of the eNB1 returns an ISC-C activation response message to the CTRL0 of the central control base station eNB0, where the ISC-C activation response message carries an address of the L1 cell instance of the eNB1.

1209: The CTRL2 of the eNB2 returns the ISC-C activation response message to the CTRL0 of the central control base station eNB0, where the ISC-C activation response message carries an address of the L1 cell instance of the eNB2.

Steps 1208 and 1209 are optional, and may be performed according to the process in FIG. 8.

1210: The CTRL 0 of the eNB0 sends a reconfiguration message L2 Recfg to the L2 cell instance (L2 0) of the eNB0, where the reconfiguration message L2 Recfg carries the addresses of the L1 cell instances of the corresponding eNBs (eNB1 and eNB2).

After the L2 cell instance of the eNB0 and the L1 cell instance of each eNB, namely, the eNB0, the eNB1, and the eNB2, obtain each other's address, service interaction begins, where a service interaction process may be performed with reference to the method in FIG. 9.

In this way, cell activation processing in a scenario of SFN coordination is implemented.

Figure 15:
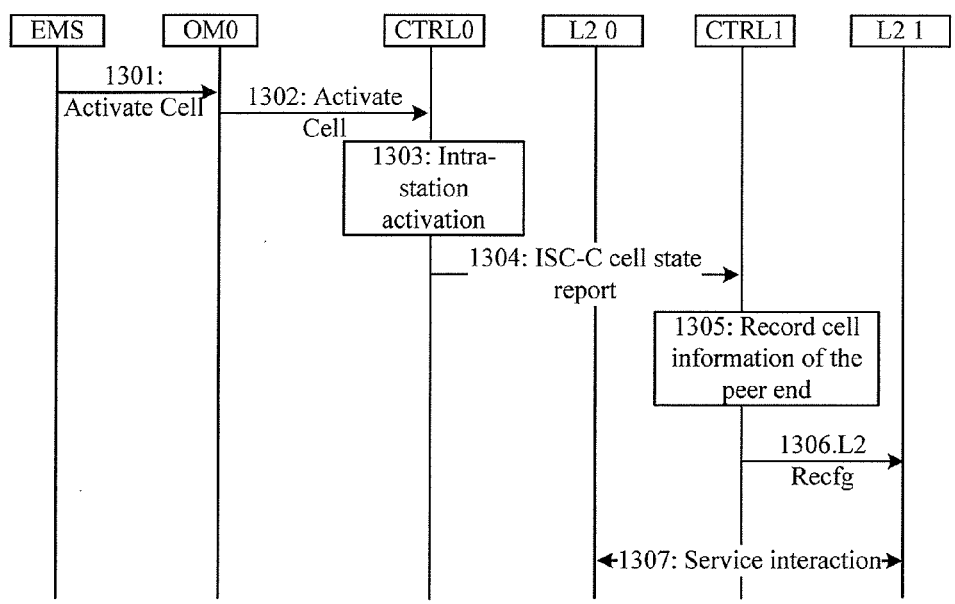
FIG. 15 is a schematic flowchart of a cell activation process according to another embodiment of the present invention.

FIG. 15 is a schematic flowchart of a cell activation process according to another embodiment of the present invention. The process in FIG. 15 may be applied to CA coordination, and the process in FIG. 15 is performed for each base station on a component carrier of CA.

In an example of the embodiment in FIG. 15, two base stations eNB0 and eNB1 each provide a component carrier to form a CA cell. However, this embodiment of the present invention is not limited to the specific example, and a quantity of base stations and a quantity of component carriers may be adjusted according to needs. In addition, for simplicity, the embodiment in FIG. 15 is described by using an example in which a control module CTRL0 of the eNB0 sends a cell state report to a control module CTRL1 of the eNB1. However, this embodiment of the present invention is not limited to such control plane interaction, and a manner in which a cell state report is sent from the eNB1 to the eNB0 is the same.

1301: An EMS sends an activate cell (Activate Cell) command to the base station eNB0 to activate a cell.

1302: An OM0 of the base station eNB0 processes the activate cell command, converts the activate cell command to an internal message, and forwards the internal message to the CTRL0.

1303: The base station eNB0 performs processing according to an intra-station activation process.

1304: The CTRL0 of the base station eNB0 sends an ISC-C cell state report message (Cell State Report) to a CTRL1 of a related base station (the eNB1 in this example), where the ISC-C cell state report message carries cell information (such as an address of an L2 cell instance) of a local end (the eNB0 in this example). In this example, a related base station (or called a "peer end") of the base station eNB0 is the base station eNB1, and a related base station of the base station eNB1 is the base station eNB0, the ISC-C cell state report message is an example of a control plane packet in FIG. 8, and step 1304 may be performed in the manner shown in FIG. 8.

1305: The related base station eNB1 stores the cell information of the peer end (the eNB0 in this example).

1306: If a cell of the base station eNB1 is activated first, an L2 Recfg message needs to be sent to an L2 module (L2 1) of the base station eNB1, to inform the L2 1 of information such as an address of an L2 instance of the base station eNB0.

1307: After cell activation is completed at both ends, the L2s of the base stations eNB0 and eNB1 may begin performing CA coordination service interaction, where a service interaction process may be performed with reference to the method in FIG. 9.

In this way, cell activation processing in a scenario of CA coordination is implemented.

Figure 16:
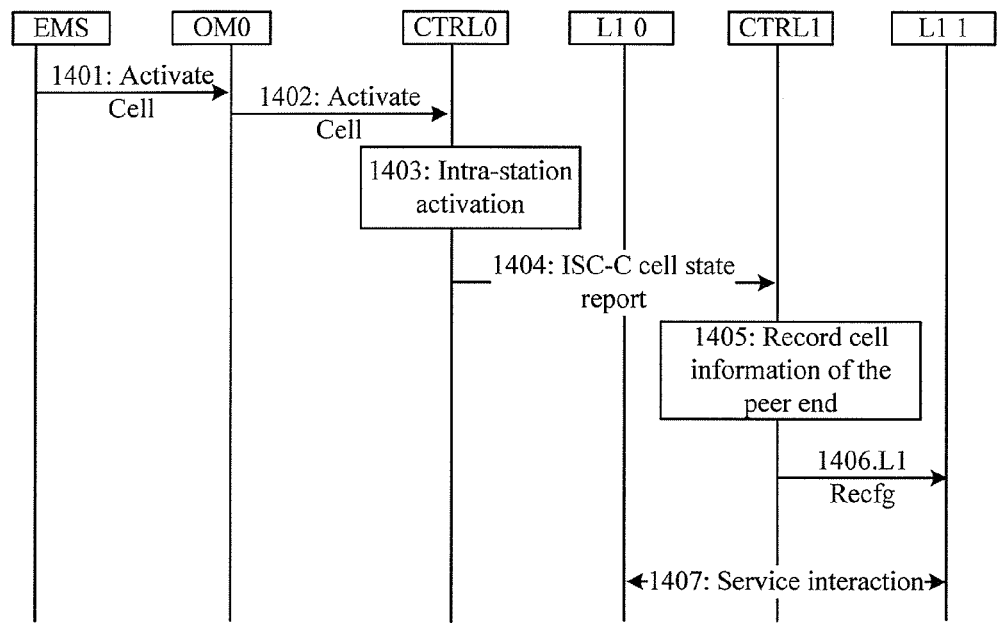
FIG. 16 is a schematic flowchart of a cell activation process according to another embodiment of the present invention.

FIG. 16 is a schematic flowchart of a cell activation process according to another embodiment of the present invention. The process in FIG. 16 may be applied to CoMP coordination, and the process in FIG. 16 is performed for each base station participating in CoMP.

In an example of the embodiment in FIG. 16, two base stations eNB0 and eNB1 each provide a cell to perform CoMP. However, this embodiment of the present invention is not limited to the specific example, and a quantity of base stations and a quantity of cells participating in CoMP may be adjusted according to needs. In addition, for simplicity, the embodiment in FIG. 16 is described by using an example in which a control module CTRL0 of the eNB0 sends a cell state report to a control module CTRL1 of the eNB1. However, this embodiment of the present invention is not limited to such control plane interaction, and a manner in which a cell state report is sent from the eNB1 to the eNB0 is the same.

1401: An EMS sends an activate cell (Activate Cell) command to the base station eNB0 to activate a cell.

1402: An OM0 of the base station eNB0 processes the activate cell command, converts the activate cell command to an internal message, and forwards the internal message to the CTRL0.

1403: The base station eNB0 performs processing according to an intra-station activation process.

1404: The CTRL0 of the eNB0 sends an ISC-C cell state report message (Cell State Report) to a CTRL1 of a related base station (the eNB1 in this example), where the ISC-C cell state report message carries cell information (such as an address of an L1 cell instance) of a local end (the eNB0 in this example). In this example, a related base station (or called a "peer end") of the base station eNB0 is the base station eNB1, and a related base station of the base station eNB1 is the base station eNB0, the ISC-C cell state report message is an example of a control plane packet in FIG. 8, and step 1404 may be performed in the manner shown in FIG. 8.

1405: The related base station eNB1 stores the cell information of the peer end (the eNB0 in this example).

1406: If a cell of the base station eNB1 is activated first, an L1 Recfg message needs to be sent to an L1 module (L11) of the base station eNB1, to inform the L11 of information such as an address of an L1 instance of the base station eNB0.

1407: After cell activation is completed at both ends, the L1s of the base stations eNB0 and eNB1 may begin performing CoMP coordination service interaction, where a service interaction process may be performed with reference to the method shown in FIG. 9.

In this way, cell activation processing in a scenario of CoMP coordination is implemented.

It should be noted that an execution sequence of steps in the foregoing exemplary processes in FIG. 11 to FIG. 16 imposes no limitation on the scope of the embodiments of the present invention. The steps may be performed in a different sequence or in parallel, without departing from the scope of the embodiments of the present invention.

Figure 17:
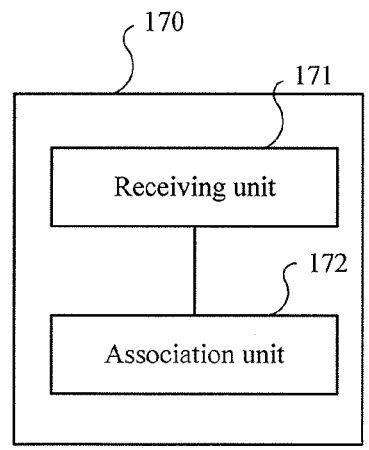
FIG. 17 is a block diagram of a base station according to an embodiment of the present invention.

FIG. 17 is a block diagram of a base station according to an embodiment of the present invention. The base station 170 in FIG. 17 includes a receiving unit 171 and an association unit 172.

The receiving unit 171 receives a cell association command sent by an element management system. The cell association command carries information about a second base station to be associated with a coordinated cell of the base station 170.

The association unit 172 associates the coordinated cell of the base station 170 with the second base station according to the information about the second base station to be associated with the coordinated cell of the base station 170.

In this way, cell association configuration during inter-base station coordination can be implemented.

The base station 170 in FIG. 17 can implement each process of methods of FIG. 10 to FIG. 16 performed by a first base station. To avoid repetition, details are not described herein again. Optionally, the receiving unit 171 may be implemented by an interface or a receiver circuit, and the association unit 172 may be implemented by a processor.

Optionally, as an embodiment, the coordinated cell may be an SFN cell, a CoMP cell, or a CA cell involved in inter-base station coordination. However, this embodiment of the present invention imposes no limitation on a specific form of inter-base station coordination.

Optionally, as another embodiment, the information about the second base station may be an identifier of the second base station.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that may store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A first base station for inter-base station coordination communication, comprising:

a processor, a memory coupled to the processor, a first logical interface and a second logical interface for communicating with a second base station;
wherein the processor is configured to:
exchange a control plane packet with a second base station through the first logical interface for controlling an inter-base station coordination between the first and second base stations, wherein a protocol for exchanging the control plane packet with the second base station through the first logical interface comprises Internet Protocol (IP); and
exchange a user plane packet with the second base station through the second logical interface for implementing an inter-base station coordination involving the first and second base stations, wherein a protocol for exchanging the user plane packet through the second logical interface comprises a rapid input/output (Rapid I/O) protocol or a common public radio interface (CPRI) protocol; and, wherein
the inter-base station coordination comprises carrier aggregation (CA) or coordinated multi-point (CoMP), and the first base station further comprises an interface between the first base station and an element management system (EMS), wherein the processor is further configured to:
receive an activate cell command sent by the EMS through the interface:
activate a first cell according to the activate cell command;
receive a cell state report message of a second cell sent by the second base station though first logical interface, wherein the cell state report message of the second cell indicates the second cell is activated; and
perform the CA or the CoMP coordination service interaction with the second base station through the second logical interface.

2. The first base station according to claim 1, wherein the processor is further configured to:
receive the cell state report message of the second cell sent by the second base station through the first logical interface through a switch unit (SWU); and
perform the CA or CoMP coordination service interaction with the second base station through the second logical interface and through the SWU, wherein the SWU provides a routing service and a switching service between the first base station and the second base station.

3. The first base station according to claim 1, wherein the processor is further configured to:
send a cell state report message of the first cell to the second base station through the first logical interface, wherein the cell state report message of the first cell indicates the first cell is activated.

4. The first base station according to claim 3, wherein the processor is further configured to:
send the cell state report message of the first cell to the second base station through the first logical interface through a switch unit (SWU), wherein the SWU provides a routing service and a switching service between the first base station and the second base station.

5. The first base station according to claim 1, wherein the processor is further configured to:
receive an add cell command sent by the EMS, wherein the add cell command carries a configuration parameter of the first cell, wherein the configuration parameter of the first cell comprises at least one of a frequency channel number, a bandwidth, and a power;

receive an add cell base station reference command sent by the EMS, wherein the add cell base station reference command carries information of the second base station, wherein the information of the second base station comprises an identifier of the second base station; and
associate the first cell with the second base station.

6. The first base station according to claim 1, wherein the first base station is an evolved NodeB (eNB) in long term evolution (LTE) system, and the second base station is an eNB in the LTE system.

7. A method for inter-base station coordination communication, comprising:
exchanging, by a first base station, a control plane packet with a second base station through the first logical interface for controlling an inter-base station coordination between the first and second base stations, wherein a protocol for exchanging the control plane packet with the second base station through the first logical interface comprises Internet Protocol (IP); and
exchanging, by the first base station, a user plane packet with the second base station through the second logical interface for implementing an inter-base station coordination involving the first and second base stations, wherein a protocol for exchanging the user plane packet through the second logical interface comprises a rapid input/output (Rapid I/O) protocol or a common public radio interface (CPRI) protocol; and, wherein
the inter-base station coordination comprises carrier aggregation (CA) or coordinated multi-point (CoMP), and the method further comprises:
receiving, by the first base station, an activate cell command sent by an element management system (EMS);
activating, by the first base station, a first cell according to the activate cell command;
receiving, by the first base station, a cell state report message of a second cell sent by the second base station through the first logical interface, wherein the cell state report message of the second cell indicates the second cell is activated; and
performing, by the first base station, the CA or the CoMP coordination service interaction with the second base station through the second logical interface.

8. The method according to claim 7, wherein the receiving, by the first base station, a cell state report message of a second cell sent by the second base station through the first logical interface, comprises:
receiving, by the first base station, the cell state report message of the second cell sent by the second base station through the first logical interface through a switch unit (SWU); and
performing, by the first base station, the CA or CoMP coordination service interaction with the second base station through the second logical interface, comprises:
performing, by the first base station, the CA or CoMP coordination service interaction with the second base station through the second logical interface and through the SWU, wherein the SWU provides a routing service and a switching service between the first base station and the second base station.

9. The method according to claim 7, wherein the method further comprising:
sending, by the first base station, a cell state report message of the first cell to the second base station through the first logical interface, wherein the cell state report message of the first cell indicates the first cell is activated.

10. The method according to claim 9, wherein sending, by the first base station, a cell state report message of the first cell to the second base station through the first logical interface, comprises:
- sending, by the first base station, the cell state report message of the first cell to the second base station through the first logical interface and through a switch unit (SWU), wherein the SWU provides a routing service and a switching service between the first base station and the second base station.

11. The method according to claim 7, wherein the method further comprises:
- receiving, by the first base station, an add cell command sent by the EMS, wherein the add cell command carries a configuration parameter of the first cell, wherein the configuration parameter of the first cell comprises at least one of a frequency channel number, a bandwidth, and a power;
- receiving, by the first base station, an add cell base station reference command sent by the EMS, wherein the add cell base station reference command carries information of the second base station, wherein the information of the second base station comprises an identifier of the second base station; and
- associating, by the first base station, the first cell with the second base station.

12. The method according to claim 7, wherein the first base station is an evolved NodeB (eNB) in long term evolution (LTE) system, and the second base station is an eNB in the LTE system.

* * * * *